(No Model.)
W. R. BETHAM.
WEATHER STRIP FOR FREIGHT CAR DOORS.
No. 449,399. Patented Mar. 31, 1891.
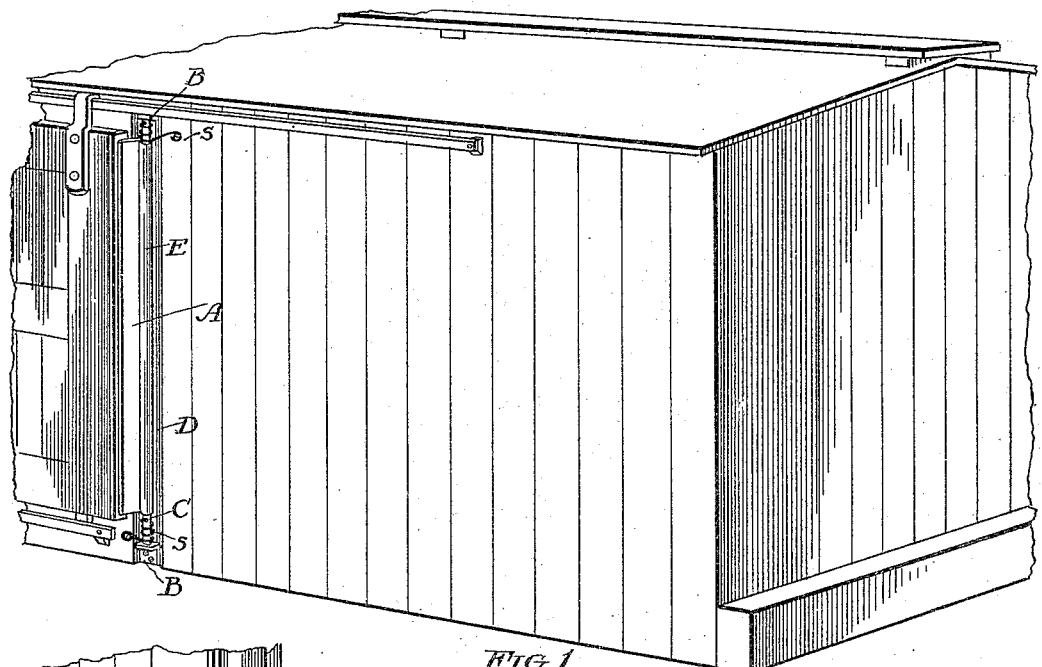
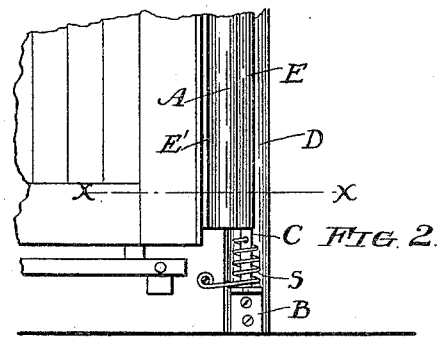
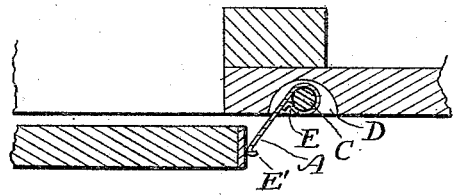
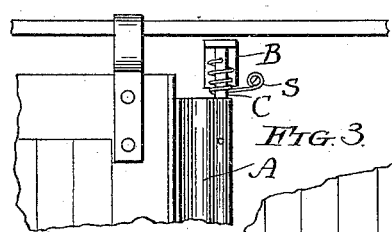
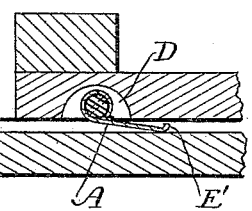
Witnesses:
Inventor:
William R. Betham
by Louis V. LeMoyne
his Atty

UNITED STATES PATENT OFFICE.

WILLIAM R. BETHAM, OF CHICAGO, ILLINOIS.

WEATHER-STRIP FOR FREIGHT-CAR DOORS.

SPECIFICATION forming part of Letters Patent No. 449,399, dated March 31, 1891.

Application filed September 13, 1890. Serial No. 364,901. (No model.)

*To all whom it may concern:*

Be it known that I, WILLIAM R. BETHAM, a citizen of the United States, residing at Chicago, Cook county, Illinois, have invented a new and useful Improvement in Weather-Strips for Freight-Car Doors, of which the following is a specification.

The object of my invention is to provide a weather-strip suitable for sliding doors, and particularly for freight-car doors, which will prevent the rain from beating in at the rear of the door between the door and the car-body.

It consists, broadly, of a flat strip hinged to the body of the car at the rear edge of the closed door, which is pressed back flat against the car when the door is opened, and which swings to and closes the crack at the rear of the door when the door slides past it and is closed.

It further consists of details of construction and operation hereinafter more fully described, and particularly pointed out in the claims.

Figure 1 is a perspective view of the body of a car with my weather-strip attached. Fig. 2 is a detail view showing the lower hinge and spring. Fig. 3 is a detail view showing the upper hinge and spring. Figs. 4 and 5 are sectional views on line $x\,x$, Fig. 2, showing the positions of the weather-strip when the door is closed and when it is open, respectively. Fig. 6 shows a modified form of hinge.

A represents the weather-strip; B B, the brackets in which the rod C is pivoted.

D is the groove in the side of the car in which the weather-strip sets.

S S are the springs by which the weather-strip is actuated.

The weather-strip A is made preferably of sheet metal, with the edge E curled over the rod C and the edge E' crimped over slightly to form a rounded edge that the door will slide over smoothly. When the car-door is set quite close to the body of the car, as is the case with most cars, leaving only a narrow space between them in order to get room enough to allow the door to slide back freely over the weather-strip, I set the thick edge E in the groove D, bringing it about flush with the side of the car. When the door is opened, the weather-strip is forced back flat against the side of the car, as shown in Fig. 5, and the door slides over it. When the door is closed, it slides off of the weather-strip and the latter is swung over by the springs and closes the crack at the rear edge of the door, the strength of the springs being sufficient to retain the weather-strip against the edge of the door, keeping the crack tightly closed.

The springs S S may be done away with and a gravity-hinge used, such as shown in Fig. 6, in which the rod is shown with collar H attached to it, which latter has an inclined face bearing upon the inclined face of the socket J, and by this means the weather-strip will be swung to of its own weight.

What I claim, and desire to secure by Letters Patent, is—

1. The herein-described weather-strip, consisting of the combination, with the car-body and the sliding door, of the flat strip A, having its inner edge hinged to the body of the car at the rear edge of the closed door and arranged to swing back flat against the car-body to allow the door to slide freely over it, and the springs S S or similar device for automatically swinging to said strip and retaining its outer edge against the rear edge of the door, all substantially as shown and described.

2. The herein-described weather-strip, consisting of the combination, with the car-body and sliding door, of the strip A, having the curled edge E, the rod C, running through the latter, the brackets B B, in which the rod C is pivoted, the groove D, into which the edge E sets, and the springs S S, all substantially as shown and described.

WILLIAM R. BETHAM.

Witnesses:
F. J. LE MOYNE,
L. V. LE MOYNE.